US006974077B1

(12) United States Patent
Beyder et al.

(10) Patent No.: US 6,974,077 B1
(45) Date of Patent: Dec. 13, 2005

(54) METHOD OF REMOTE PICKING-UP OF SOILED LAUNDRY AND DELIVERING CLEAN LAUNDRY WITH ON-SITE YET REMOTE WEIGHING

(76) Inventors: Edward Beyder, 12 Golden Pond Dr., Milltown, NJ (US) 08850; Igor Beyder, 12 Golden Pond Dr., Milltown, NJ (US) 08850

( * ) Notice: Subject to any disclaimer, the term of this patent is extended or adjusted under 35 U.S.C. 154(b) by 0 days.

(21) Appl. No.: 10/938,461

(22) Filed: Sep. 9, 2004

(51) Int. Cl.[7] .......... G06F 7/08
(52) U.S. Cl. .......... 235/381; 235/383
(58) Field of Search .......... 235/381, 384, 235/385, 383

(56) References Cited

U.S. PATENT DOCUMENTS 5,616,899 A * 4/1997 Recigno .......... 235/375
6,010,239 A * 1/2000 Hardgrave et al. .......... 700/213
6,769,611 B2 * 8/2004 Miller et al. .......... 235/382
6,882,269 B2 * 4/2005 Moreno .......... 340/5.73
2001/0042024 A1 * 11/2001 Rogers .......... 705/26
2003/0033181 A1 * 2/2003 Simon et al. .......... 705/7

* cited by examiner

*Primary Examiner*—Daniel Stcyr
(74) *Attorney, Agent, or Firm*—Levisohn, Berger & Langsam, LLP

(57) ABSTRACT

A method of pick-up of soiled laundry and dry cleaning and re-delivery of the same after washing and dry-cleaning at a remote servicing site. The method includes providing a pick-up and delivery vehicle proximal to the location of the customer for a set range of time and date. The vehicle is provided with a laundry scale and an invoice printer/generator so that the customer receives an invoice at the site where the customer drops off his/her soiled laundry. The invoice lists the quantity of soiled articles, the anticipated cost of the services, and the date, time and location for pick-up of washed/dry cleaned articles. Upon delivery of the laundered garments, the client pays for the services and receives the indicated and invoiced, now laundered articles.

7 Claims, 1 Drawing Sheet

METHOD OF REMOTE PICKING-UP OF SOILED LAUNDRY AND DELIVERING CLEAN LAUNDRY WITH ON-SITE YET REMOTE WEIGHING

BACKGROUND OF THE INVENTION

1. Field of the Invention

The present invention is generally directed to laundry and dry cleaning services and more specifically to a method of remotely and mobilely receiving articles to be laundered/cleaned or serviced with the capability of remote on-site weighing and invoice generation on the delivery vehicle itself and delivering the laundeered and dry-cleaned articles back to the customer for pick-up.

2. Description of Related Art

Household duties have always been the focus of a variety of devices which reduce both the amount of time spent and effort expended to complete a particular household chore. Among other household duties which have to be performed on a routine basis such as cooking and cleaning, laundering today presents one of the most time intensive, troublesome, and physically demanding duties. Although laundry machines, including washing and drying machines, have been developed to reduce the effort expended and ease the chore of laundering, the task itself is still a burden. And, in any event, not everyone owns or has easy access to a machine (nor the time) to use one. As society struggles to increase its productivity, disposable time becomes more sparse and increasingly valuable.

Those who regularly do laundry within their own homes understand that even with laundry machines, washing clothes is a lengthy and time consuming process. Foremost, dirty clothes, sheets, towels, and the like, must be collected from various locations in a particular home or business and then stored in a central location for an indefinite period of time. After one decides that the articles are to be washed, they must be sorted according to a number of variables such as the type of garment, the color of the article, the particular fabric, etc. with attention given to the manufacturers' directions for washing (which is commonly described on a tag attached to the article). For example, some articles require a gentle warm cycle whereas others require a cold water cycle. Even if the articles are carefully sorted, it is not unusual for articles to become intermixed incorrectly, which can lead to unpleasant changes in color, size, and/or wrinkle-ness for one, a few, or even all the contents of a particular laundry load. The attentiveness and knowledge of the person, the washer, loading the washing machine, is critical when sorting the articles to be washed as a small mistake can permanently ruin some garments.

After the articles have been sorted, the type of detergent, softener, and/or bleach must be selected and applied. These additives must be carefully used in varying amounts, at different times throughout the washing process, based on the articles within the washing machine and the washer's intended purpose (such as bleaching). Thus, the washer (the individual) may spend much of his or her time, throughout the wash cycle, attending to the washing machine to apply, for example, the fabric softener after a particular segment of the wash cycle is complete. When the washing machine completes the entire cycle, the individual has to remove all of the clothing in preparation for the drying process. This, too, can be a dreaded task as the articles are now much heavier because they are wet. Like before, the articles are sorted based on factors such as fabric, to begin the drying process. Some articles can be placed in a drying machine whereas others must be hung out or in to dry. Even those which can be dried by machine may have to be sorted by the type of heat they can endure. For example, fabrics such as linen may require a "tumble dry" cycle as opposed to cotton fabrics which are usually dried on a "high heat" cycle. Again, a simple mistake in sorting can leave the individual, for example, with a shirt that is many sizes too small. After drying is completed, the articles must then be folded and returned to closets, drawers, and the like.

As described, laundering is an exhaustive, sometimes difficult, not terribly rewarding task and requires a large time frame for its completion. It is frequently considered drudgery. Even with time, however, mistakes can be made. Thus, for those who do not have laundry (and/or drying) machines, prefer not to wash garments by hand, or simply prefer not to expend the time to do their own laundry, they turn to third-party laundry and dry-cleaning service providers. Laundry service and dry-cleaning service providers have become commonplace in society and continue to experience a tremendous rate of growth. Due to a variety of reasons, as alluded to above, individuals, organizations, and larger corporations outsource their garments to third-party professional clothes washers and cleaners. Outsourcing laundry is convenient, saves the individual or group time and sometimes money, and can be the only option for those who do not own a washer or clothes dryer. Moreover, professional launderers and cleaners are experienced in handling a wide range of garments and fabrics, which is critical when dealing with more natural and the wide variety of fibers such as wools, cottons, linens, silks and blends of the same now available.

Those with large loads of laundry and many articles of dry cleaning, such as fitness centers or hotel properties, may choose to have a laundry service provider handle all of their articles. These providers can even arrange for the laundry and/or dry cleaning to be picked up and re-delivered directly to the individual client after servicing (laundry and/or dry cleaning). This way, the client does not have to physically package and transport the articles to the provider and to subsequently pick up the articles from the provider. It is a convenience to everyone from individuals to small businesses to corporations. For persons with busy lifestyles, pickup of soiled articles of laundry and delivery of services, i.e., washed and/or dry-cleaned articles or laundry, at the location where the soiled laundry was "created," is ideal and has become commonplace in larger metropolitan cities and suburban areas.

Although third-party laundry and dry cleaning providers eliminate some of the hassle involved with laundry, through personalized pickup and delivery, the client and provider of the laundry and cleaning services still must arrange for a precise appointment time. Thus, in advance, the client and laundry provider mutually agree on a pickup and/or delivery time (since money is often involved) which forces both parties to meet at that precise time, usually at the client's home or business. This can be an inconvenience to both parties if one or both parties is unable to meet at that particular time because of on an unforeseen event, such as traffic on the highways. With pickup and delivery, if one party fails to make it to the appointment on time before the other leaves, the transaction does not occur. Soiled laundry may not be given or clean laundry dropped off. Payment may not occur. Yet, this is not the only problem with personalized pickup and delivery of laundry and dry cleaning.

With conventional laundry service providers that pickup and deliver, an invoice is not prepared for the client at the time the client gives the delivery personnel the articles to be serviced. Rather, in this type of situation, the invoice is generated at a later time and provided to the client upon delivery of the articles. The invoice commonly lists information such as the date of the transaction, the client's name and address, and also, the detailed contents for the laundry and/or dry cleaning. For example, the invoice may include the weight of the laundry in pounds and ounces, the number of garments for dry cleaning, any special services such as stain removal, and the like. At the end of the invoice, a cost is then provided for the laundry services and dry cleaning. Thus, the client does not know precisely how much everything will cost when he or she hands the soiled items to the delivery personnel. This is because the service provider, who physically picks up the delivery, does not usually count the items, and, to the inventors' knowledge, does not possess a weighing machine on his person or in the truck, and also lacks any type of invoice printer or generator. Instead, the laundry provider picks up the articles, transports the articles to the laundry and/or dry cleaning site, where it is weighed and counted, and then the articles are identified, specific instructions recorded, and an invoice generated. The launderer performs the cleaning service and returns the serviced laundry to the client and presents an invoice for payment. Typically, the client does not learn of the precise charges until the delivery of the laundered articles, well after the laundry is first picked up and after the services have been performed—which can easily lead to an unpleasant situation if the charges are unexpected. In addition, by asking for payment upon delivery of washed laundry, the client may be unprepared for rendering the payment as he or she does not know how much the services cost until that point; as a consequence, this can be time consuming for both the delivery personnel and client as the client searches for his or her cash, checkbook, credit card, or the like.

There is a need for the pickup of soiled laundry and dry cleaning and delivery of laundered or cleaned clothing service which gives both the client and laundry provider flexibility in choosing a pickup and delivery time, and provides the client, upon dropping off the articles to be serviced, an invoice detailing the number of soiled items, their weight (where appropriate) at the time the soiled laundry is given to the delivery vehicle personnel, and the anticipated cost of the entire transaction.

SUMMARY OF THE INVENTION

In accordance with the present invention, a method of receiving soiled laundry and to-be-dry cleaned materials, laundering the same and delivering cleaned laundry and/or dry cleaning articles with the capability of weighing and/or counting the laundry in or on the pick-up and delivery vehicle and generating an invoice at the time of pick-up is provided. This new method, with the described features, preferably used in conjunction with existing laundry and dry cleaning sites, enables an improved manner of invoice reporting to the client. By implementing conventional laundry scales to weigh the laundry and an invoice printing or generating machine to print receipts on the pick-up/delivery vehicle itself, the client is informed of the laundry and/or dry cleaning charges when the soiled articles are first given to the service provider. Furthermore, the generated invoice serves as documented proof of the articles taken by the vehicle personnel.

It is an object of the invention to provide an improved method of providing laundry and dry cleaning services to be used in conjunction with existing laundry and dry cleaning service providers which substantially eliminates the difficulty of arranging for an exact time for pickup and delivery.

Another object of the invention is to provide such an improved method which is easy to implement and produces reliable and accurate invoicing receipts at the time the soiled articles of laundry and dry cleaning are first dropped off by the client.

Another object of the present invention is to allow for the customer to pre-register and store over the internet their name; address; laundry preferences (starch, on hangers or in boxes, turn-around time, special instructions, etc.); their credit card information, etc. This information will allow the customer to more quickly provide the soiled laundry to the pick-up truck and, in addition, will allow for quicker pick-up of clean laundry since the transaction can be done by credit card, all stored and authorized. In a preferred embodiment, the registration information is stored in a secure server of the laundry facility. After registration is completed, the customer is provided with a three element alphanumeric identifier comprised of a customer number; a franchise number or locator, i.e., which facility is responsible for the services; and an order number (which will change for each drop-off of soiled laundry). In this preferred embodiment, the first time that the customer actually drops off his soiled laundry at the truck, he is instructed to touch his finger to a FingerPad that digitally, visually and/or biometrically connects the customer with the stored customer information (called up by the associated computer by the provided 3-element alphanumeric identifier provided to the customer after registration was completed). Also preferably, each truck is equipped with wireless technology that allows each transaction to be processed instantly, whether within a town, city, county, state or other geographic area. This eliminates the risk of hardware malfunctions aboard the truck, may cut down on the order/payment processing and waiting times for customers.

For laundry orders, then, the present invention, in the preferred embodiment, allows a pre-registered customer to bring his/her laundry to the truck where it is placed on the scale. As the scale weighs the laundry, the customer touches the FingerPad, a fingerprint reading and comparing device connected to a computer with stored fingerprints of registered customers, and initiates the pre-payment process, reading the laundry weight from the scale, calculating the order based on weight and rates and providing, via a connected printer, a receipt for the customer. This can either be a prepaid invoice or a receipt for the laundry delivered to the customer. In one embodiment, the customer can be requested to sign the invoice and this constitutes authorization and approval of the invoiced amount, which will be cleared through a bank, when the cleaned and/or washed laundry is delivered or made available to the customer.

In another aspect of the invention, the dry cleaning order, similar to the laundry order, can be placed via the internet. The server receives the specific dry cleaning instructions and calculates the payment amount. The customer can then print out his order on his home (or office) printer and physically hand it to the truck attendant for item count verification. Again, the customer can be requested to touch the FingerPad for activation of the system, verification of the person and order, for payment, prepayment authorization and/or receipt. These, too, are objects sought to be accomplished by the present invention.

Yet another object of the invention is to provide such a method which advantageously employs current weighing technology to provide laundry data which is used for generating precise invoices and receipts.

It is a further object of the invention to provide an improved method of invoicing for laundry and dry cleaning services which produces reliable and accurate results and furthermore, serves as documented proof of those articles taken by the vehicle personnel. Payment by the customer is without "surprises" as the customer knows beforehand how much money is needed to retrieve the laundered goods.

It is another object of the invention to provide a method which can accommodate clients that are individuals, groups, organizations, larger corporations, and the like.

Other objects, advantages, and features of this invention will become apparent from the following description.

DETAILED DESCRIPTION OF THE DRAWINGS AND THE PREFERRED EMBODIMENT

Figure 1:
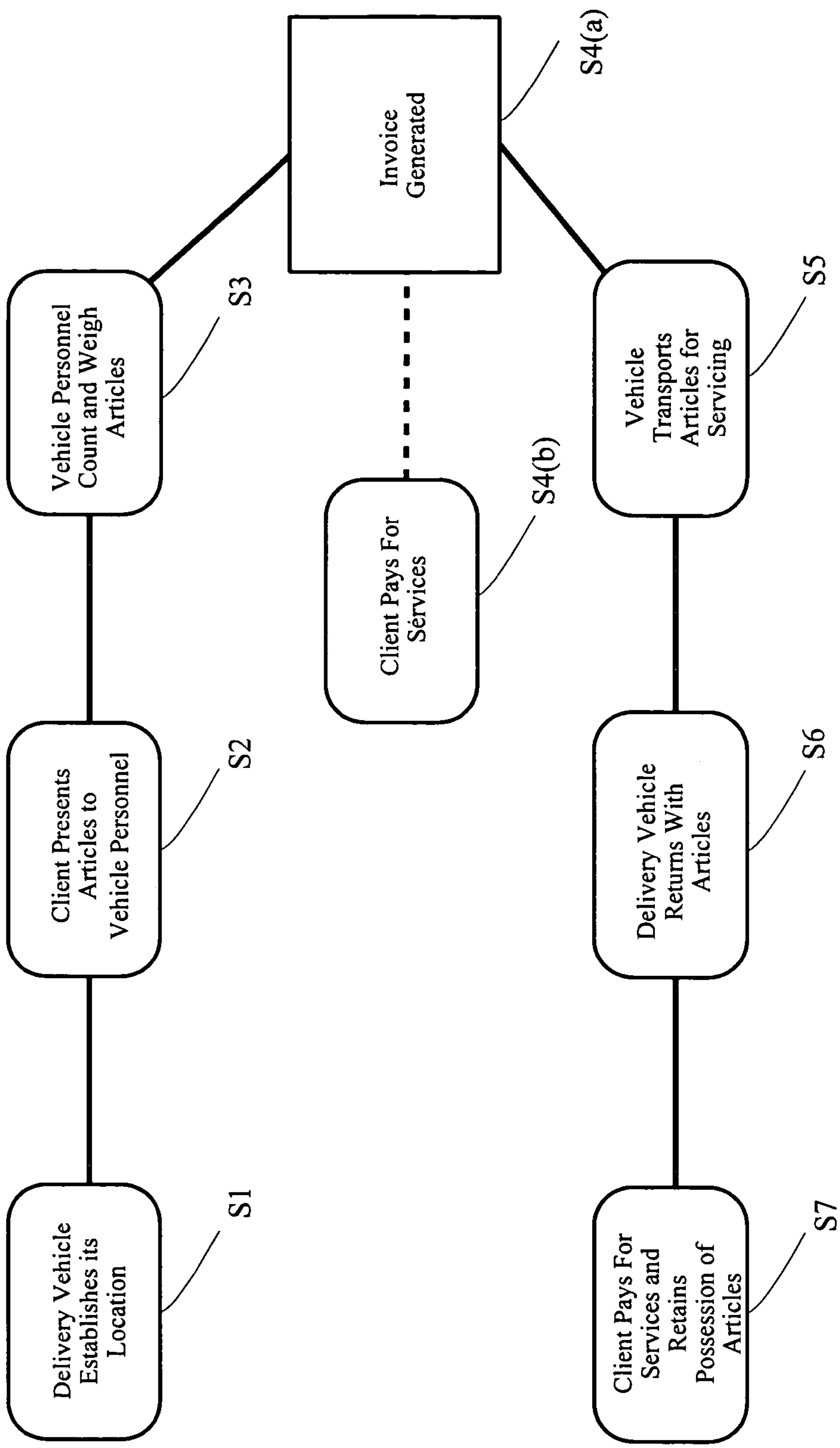
FIG. 1 is a flow-chart describing the basic steps of the preferred embodiment of the present invention.

The present invention relates to a method of pick up and delivery of clothing for performing laundry and dry cleaning services with weighing or counting of laundry at the time of pick-up and invoice generation on the pick-up/delivery vehicle. Various modifications to the preferred embodiment will be readily apparent to those skilled in the art and the general principles herein may be applied to other embodiments. The present invention is not intended to be limited to the embodiment shown or described but is to be accorded the widest scope consistent with the principles and features described herein. Preferably, the present invention is to be used with conventional site-based or centralized laundry and dry cleaning services and machinery.

Description will now be given of the inventive method with reference to FIG. 1. It should be noted that the drawing (a flow chart) is exemplary in nature and in no way serves to limit the scope of the invention. The term article and laundry article are used interchangeably to describe any item of laundry and/or dry cleaning such as clothing, shirts, suits, slacks, garments, towels, bed sheets, and the like. The preferred method of performing the inventive laundry and dry cleaning services comprises seven main steps as described below.

FIG. 1 shows the detailed steps of the inventive method. The first step, S1, is the establishment of a location by the pick-up/delivery vehicle. The vehicle is any motor vehicle which is capable of transporting soiled laundry articles for laundering and/or dry cleaning and redelivering washed, laundered and/or dry cleaned articles after servicing by the laundry facility/site. Preferably, the delivery vehicle is a van with enough room to store and transport many laundry articles. It is parked by the operator at the designated pickup and delivery location for a range of time. For example, the van may rest in the corner of an apartment complex's parking lot for a two hour time frame. By establishing a precise location for a set period or range of time, neither the client nor the service provider is forced to exactly meet the other at the customer's door to his/her home or unit at a specific time. Thus, if a client is caught in traffic or must attend an emergency business meeting, the client may still be able to drop off or pick up their respective articles (and pay for the same) because of the range of time, much like a store with operating hours at a centralized, convenient location for many customers. In addition, the pickup vehicle (which could be the same vehicle as the delivery vehicle but can be separate vehicles) should have a conventional laundering scale for weighing laundry articles and an invoice printer or generator.

As shown in FIG. 1, the second step of the inventive method, S2, is the presentment of the soiled articles by the client to the delivery vehicle personnel. Preferably, the client, with his or her articles, goes to the delivery vehicle itself and presents the articles. In an alternative embodiment, the delivery personnel parks the vehicle and the personnel pays personal visits to the client to pick up the articles. The articles may be presented in a garment bag, laundry basket, on hangers, and the like; the service provider may choose to accept the articles in a variety of ways based on its own preference.

The third step of the method, S3, consists of accounting for the client's articles. The delivery personnel counts the articles, such as those which are to be dry cleaned, and/or weighs the soiled laundry. The scale within the delivery vehicle allows the personnel to weigh the articles. Upon accounting for the articles, the information is recorded either by hand or preferably, electronically into a database.

In the next step, S4*a*, the information concerning the soiled articles is used to generate an invoice. The invoice can be hand written, or preferably, generated by a conventional cash register or computer linked to a receipt printer. Preferably, the invoice generator or printer is located on the pick-up vehicle. The computer may also be linked to a wireless network in which the data is transmitted to the central laundry servicing site. The invoice lists the garments/laundry, the cost of the services and in addition, may display an itemized list of the articles and/or their weight, the cost with respect to each, and the date of pickup and the date, time and/or location of anticipated delivery. Of course, a name and invoice number may be printed, too, on the invoice. Thus, the client knows, in advance, the charges for the laundry and/or dry cleaning services. Unlike typical remote delivery services for laundry and/or dry cleaning which do not generate and provide a receipt at the point of pickup, the inventive method allows for the client to receive, before services are rendered, a receipt with all applicable service details from the delivery personnel. The invoice may list the amount of laundry, in pounds and ounces, the cost per pound or ounces of laundry, and the total cost for the laundry based on its weight. Also the receipt may include the number of articles to be dry cleaned such as pants, blouses, shirts, and the like, and the cost for each item. The invoice also includes the total amount owed to the service provider by the client. Furthermore, the receipt serves as documented proof that the delivery vehicle accepted possession of the precise quantity of the client's belongings. Thus, if the delivery personnel fail to return all of the articles, the client has a receipt indicating the laundry service's liability. Importantly, the total cost and time, date and location for pick-up by the customer of the serviced, i.e., laundered and dry-cleaned articles are printed on the receipt, for the customer's convenience and use.

At this point, the client may choose to pay for the services, as depicted by step S4(*b*) in FIG. 1, or may wait to pay for the services upon picking up the laundered articles. Payment may be made in any conventional manner including cash, check, "house charge"or credit card and the delivery vehicle is equipped with machinery, for example, a cash register and appropriate credit card equipment, to receive payment. Thereupon, the vehicle personnel will provide a paid receipt, verifying that the services were paid for.

As shown in step S5 of FIG. 1, the delivery vehicle, after receipt of soiled laundry, transports the articles to a remote laundry facility for laundry/dry cleaning servicing. The articles may be taken to a central location for further sorting or distribution or preferably, the articles are directly delivered to the location where the articles will be serviced. The party which provides the laundering and dry cleaning services need not be the same as or affiliated with the pick-up and deliverer but, preferably, the vehicle and driver are employed by the same entity as the washing/dry cleaning provider. After the articles are serviced (laundered, dry cleaned, etc.), the same or a different delivery vehicle obtains possession of the articles and returns to the respective location at or near the indicated time and date, to distribute the articles back to its customers, as designated by step S6. Again, the delivery vehicle may rest in a particular location for a period of time to give clients the flexibility of picking up the articles within a time frame.

In the final step, S7, the client returns to the delivery vehicle to receive his or her laundered belongings and to pay for the services, if not paid for upon dropping off of the soiled articles. The delivery personnel may require the client to display the original receipt, a picture ID, or the like, before releasing the articles to the client. Because the client already knows the total charges for the services, the client may readily provide payment, in any conventional manner, to the delivery personnel. This is especially time efficient as the customer will bring the proper amount of cash or a pre-filled check. Additionally, if the number of articles designated on the original receipt does not match the number of articles delivered back to the client, the client has documented proof of his or her claim for a shortage. Furthermore, the client may choose to ask the delivery personnel to re-weigh the laundry articles to verify the cost of the services and that nothing is missing. If the delivery provider asks for a different payment amount than that on the original receipt, the client has documented proof that the previous payment amount be honored (unless new services were authorized or unexpectedly required).

It should be noted that the delivery vehicle can both receive soiled articles for servicing and distribute articles that have been serviced (laundered or cleaned) within the same time frame. Thus, a specific time frame does not need to be designated only for the drop off of articles and another time frame for the client pick up of serviced articles. One time period can be used to do both. This, too, seems highly efficient.

In alternate embodiments of the invention, the customer can be asked to pre-register and store over the internet their name; address; laundry preferences (starch, on hangers or in boxes, turn-around time, special instructions, etc.); their credit card information, etc. This information will allow the customer to more quickly provide the soiled laundry to the pick-up truck and, in addition, will allow for quicker pick-up of clean laundry since the transaction can be done by credit card, all stored and authorized.

In a preferred embodiment, the registration information is stored in a secure server of the laundry facility. After registration is completed, the customer is provided with a three element alphanumeric identifier comprised of a customer number; a franchise number or locator, i.e., which facility is responsible for the services; and an order number (which will change for each drop-off of soiled laundry). In this preferred embodiment, the first time that the customer actually drops off his soiled laundry at the truck, he is instructed to touch his finger to a FingerPad that digitally, visually and/or biometrically connects the customer with the stored customer information (called up by the associated computer by the provided 3-element alphanumeric identifier provided to the customer after registration was completed). Also preferably, each truck is equipped with wireless technology that allows each transaction to be processed instantly, whether within a town, city, county, state or other geographic area. This eliminates the risk of hardware malfunctions aboard the truck, may cut down on the order/payment processing and waiting times for customers.

For laundry orders, then, the present invention, in the preferred embodiment, allows a pre-registered customer to bring his/her laundry to the truck where it is placed on the scale. As the scale weighs the laundry, the customer touches the FingerPad, a fingerprint reading and comparing device connected to a computer with stored fingerprints of registered customers, and initiates the pre-payment process, reading the laundry weight from the scale, calculating the order based on weight and rates and providing, via a connected printer, a receipt for the customer. This can either be a prepaid invoice or a receipt for the laundry delivered to the customer. In one embodiment, the customer can be requested to sign the invoice and this constitutes authorization and approval of the invoiced amount, which will be cleared through a bank, when the cleaned and/or washed laundry is delivered or made available to the customer.

In another aspect of the invention, the dry cleaning order, similar to the laundry order, can be placed via the internet. The server receives the specific dry cleaning instructions and calculates the payment amount. The customer can then print out his order on his home (or office) printer and physically hand it to the truck attendant for item count verification. Again, the customer can be requested to touch the FingerPad for activation of the system, verification of the person and order, for payment, prepayment authorization and/or receipt. These, too, are objects sought to be accomplished by the present invention.

This invention is not limited to the above described preferred embodiment; other embodiments are considered to be within the scope of this invention as defined by the appended claims.

What is claimed:

1. A method of providing laundry pick-up and delivery services comprising the steps of:

providing at least one mobile pick-up and delivery vehicle which can travel from a laundry facility to one or more laundry collection locations, said vehicle comprising storage areas to stow and transport soiled laundry articles and a separate area for stowing and transporting laundered articles, a laundry scale for weighing said soiled laundry articles collected at each of said laundry collection locations, and a receipt generating mechanism providing a printed indication of the weight of said soiled laundry articles collected at each of said laundry collection locations, as determined by said scale:

providing a delivery vehicle personnel for driving said delivery vehicle between said laundry facility and each of said laundry locations, and parking said delivery vehicle in each of said laundry collection locations for a designated period of time;

said delivery vehicle personnel collecting soiled laundry articles from at least one client at at least one of said laundry collection locations;

said delivery vehicle personnel using said scale for weighing said soiled laundry articles to calculate a laundry weight;

generating a receipt for said at least one client based on said laundry weight along with the anticipated cost for said laundry services based on said weight;

servicing said laundry articles at said laundry facility upon receipt from said delivery vehicle; and said delivery vehicle personnel distributing said laundered articles to said at least one client at said designated location where said soiled laundry for said client was collected.

2. The method of providing laundry pick-up and delivery services as claimed in claim 1, further comprising the step of:

said delivery vehicle personnel receiving payment in any conventional manner for said laundry services.

3. The method of providing laundry delivery services as claimed in claim 1, wherein said laundry articles include garments, dry cleanable articles, towels, and sheets.

4. The method of providing laundry delivery services as claimed in claim 1, wherein said receipt generating mechanism belongs to a wireless network.

5. A method as claimed in claim 1 further comprising providing dry-cleaning pick-up and delivery services wherein articles of clothing desirably dry-cleaned by said client are counted, a receipt is provided therefor to said customer, said clothing is dry cleaned at said laundry facility and payment received at said laundry collection location by said delivery vehicle personnel from said client for said dry cleaned clothing.

6. A method of providing laundry pick-up and delivery services to customers comprising the steps of:

providing at least one mobile pick-up and delivery vehicle which can travel between a laundry facility and another location, said vehicle comprising a first storage areas to transport soiled laundry articles and a separate storage area for laundered articles, a laundry scale, and a memory mechanism for storing individual customers' preferences for the treatment of their laundry;

a mechanism for individually identifying said customers by a biometric identifier which corresponds to at least one stored customer identification characteristic;

providing a delivery vehicle person for said delivery vehicle and having said delivery vehicle person park said delivery vehicle at said another location for a period of time;

said delivery vehicle person receiving soiled laundry articles from at least one customer located at said another location;

said delivery vehicle person weighing said soiled laundry articles by use of said laundry scale to calculate a laundry weight of said soiled laundry articles;

generating a receipt for said at least one customer based on said laundry weight and said customer identification characteristic;

servicing said laundry articles into washed laundry at said laundry facility; and said delivery vehicle person distributing said washed laundry back to said at least one customer at said another location by parking back at said another location for a limited period of time.

7. A method as claimed in claim 6 further comprising providing dry-cleaning pick-up and delivery services wherein articles of clothing desirably dry-cleaned by said customer are counted, a receipt is provided therefor to said customer, said clothing is serviced by dry cleaning at said laundry facility and payment received by said delivery vehicle person from said customer for said dry cleaned clothing upon return to said customer at said another location.

* * * * *